(12) United States Patent
Thacker

(10) Patent No.: US 8,420,031 B2
(45) Date of Patent: Apr. 16, 2013

(54) SYSTEM AND METHOD OF SUBSTITUTE NATURAL GAS PRODUCTION

(75) Inventor: Pradeep Stanley Thacker, Bellaire, TX (US)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 12/907,932

(22) Filed: Oct. 19, 2010

(65) Prior Publication Data
US 2012/0093690 A1 Apr. 19, 2012

(51) Int. Cl.
B01J 8/04 (2006.01)
B01J 8/00 (2006.01)
B01J 19/00 (2006.01)
C10J 3/48 (2006.01)
C10J 3/46 (2006.01)
C01B 3/24 (2006.01)
C01B 3/36 (2006.01)
F22B 1/18 (2006.01)

(52) U.S. Cl.
USPC ........... 422/630; 422/129; 422/187; 422/198; 422/600; 48/62 R; 48/197 R; 48/198.1; 48/198.3; 122/7 R

(58) Field of Classification Search ................... 422/129, 422/187, 600, 630, 198; 48/62 R, 197 R, 48/198.1, 198.3; 122/7 R; 165/71, 157; 60/653
See application file for complete search history.

(56) References Cited

U.S. PATENT DOCUMENTS

| 4,863,489 | A * | 9/1989 | Suggitt | 48/197 R |
| 7,587,995 | B2 * | 9/2009 | Kraft et al. | 122/7 R |
| 7,604,400 | B2 * | 10/2009 | Thompson et al. | 374/160 |
| 2010/0011664 | A1 * | 1/2010 | Ariyapadi et al. | 48/128 |
| 2010/0170247 | A1 * | 7/2010 | Bommareddy et al. | 60/653 |
| 2010/0272619 | A1 * | 10/2010 | Frydman et al. | 422/193 |
| 2010/0324156 | A1 * | 12/2010 | Winter et al. | 518/705 |
| 2011/0072721 | A1 * | 3/2011 | Chen et al. | 48/87 |
| 2011/0229382 | A1 * | 9/2011 | Frydman et al. | 422/621 |

FOREIGN PATENT DOCUMENTS

| AT | 517971 | 8/2011 |
| EP | 1751078 | 2/2007 |
| PL | 121392 | 12/1980 |
| PL | 200792 | 4/2004 |

OTHER PUBLICATIONS

Polish Search Report issued in connection with corresponding PL Patent Application No. P-396625 filed on Oct. 18, 2011.

\* cited by examiner

*Primary Examiner* — Walter D Griffin
*Assistant Examiner* — Natasha Young
(74) *Attorney, Agent, or Firm* — Fletcher Yoder P.C.

(57) ABSTRACT

A system includes a radiant syngas cooler (RSC). The RSC includes cooling tubing configured to transmit a fluid. The RSC is configured to have a heat transfer area such that the RSC generates a pressure and a temperature of the fluid exiting the RSC to a level allowing for superheating of the fluid to between approximately 750° Fahrenheit and approximately 850° Fahrenheit. Additionally, the heat transfer area is determined based on an amount of heat to be transferred to the fluid as the fluid passes through a heat exchanger in a first path external to the RSC.

18 Claims, 3 Drawing Sheets

SYSTEM AND METHOD OF SUBSTITUTE NATURAL GAS PRODUCTION

BACKGROUND OF THE INVENTION

The subject matter disclosed herein relates to generation of substitute natural gas and power production.

Power plants are capable of generating energy from various hydrocarbon feedstock, such as coal, relatively efficiently. Technology may be used to convert the hydrocarbon feedstock into a gas mixture primarily consisting of carbon monoxide (CO) and hydrogen ($H_2$), i.e., syngas, by reaction with oxygen and steam in a gasifier. These gases may be treated, processed, and utilized as fuel in a conventional combined cycle power plant. For example, the syngas may be transmitted to a power plant that utilizes the syngas as fuel for powering a gas turbine to generate electricity. Alternatively, the syngas may be converted into substitute natural gas (SNG) prior to delivery to a gas turbine of natural gas combined cycle (NGCC) power plant. The generation of SNG from syngas is a complex undertaking with a multitude of steps and conversion units that may be costly to independently build and/or maintain.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a substitute natural gas (SNG) production system, including a gasifier configured to generate syngas, a radiant syngas cooler (RSC) configured to cool the syngas, wherein the RSC has a length of between approximately 70 feet and approximately 100 feet, a methanation unit configured to generate SNG from the syngas, and a fluid flow path from the RSC through the methanation unit, wherein generated pressure and a temperature of a fluid in the fluid flow path is based on an amount of heat to be transferred to the fluid in the fluid flow path as the fluid passes through the methanation unit.

In a second embodiment, a system includes a radiant syngas cooler (RSC) comprising cooling tubing configured to transmit a fluid, wherein the RSC is configured to have a heat transfer area such that the RSC generates a pressure and a temperature of the fluid exiting the RSC to a level allowing for superheating of the fluid to approximately 750° Fahrenheit to 850° Fahrenheit, and wherein the heat transfer area is determined based on an amount of heat to be transferred to the fluid as the fluid passes through a heat exchanger in a first path external to the RSC.

In a third embodiment, a system includes a substitute natural gas (SNG) production system, including a radiant syngas cooler (RSC) configured to configured to cool syngas, a first fluid path configured to carry water and the syngas from the RSC to a water-gas shift reactor, wherein the water-gas shift reactor is configured to adjust a hydrogen to carbon monoxide ratio in the syngas to generate shifted syngas, a methanation unit configured to generate SNG from the shifted syngas, and a second fluid path configured to carry a fluid from the RSC to the methanation unit, wherein a pressure and a temperature of the fluid in the second fluid path is based on an amount of heat to be transferred to the fluid in the second fluid path as the fluid passes through the methanation unit.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
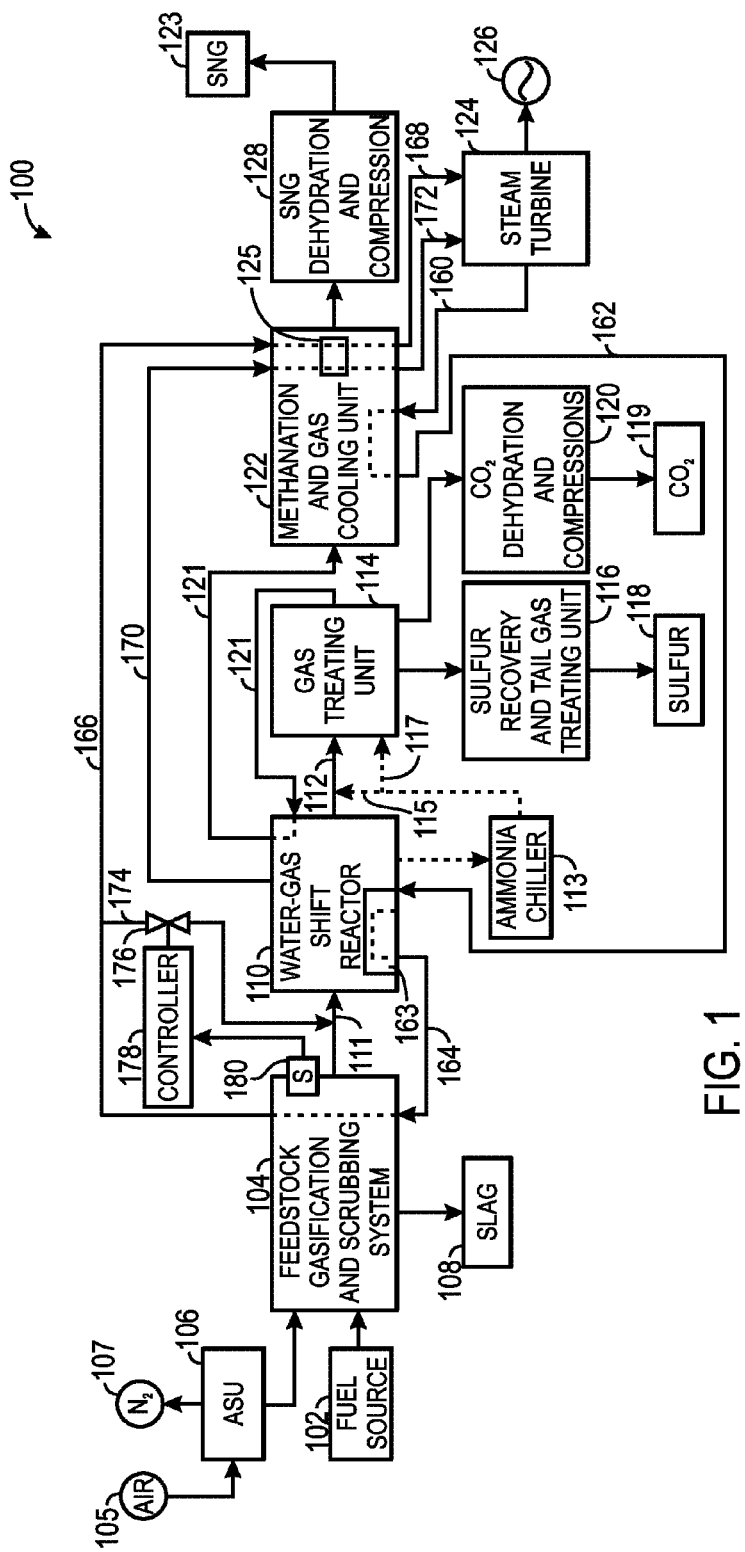
FIG. 1 a schematic block diagram of an embodiment of a substitute natural gas (SNG) production system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed a production system and methods for generating substitute natural gas (SNG) from syngas. SNG may be a gas containing primarily methane that may be produced from fuel sources such as coal or biomass. The production system for the generation of the SNG may include a radiant syngas cooler (RSC) that operates in conjunction with a methanation and gas cooling unit to superheat steam for transmission to a steam turbine. The generation of SNG from the syngas in the methanation and gas cooling unit is an exothermic reaction that may be harnessed to superheat water for generation of steam that may be used by a steam turbine to generate power. The water to be superheated may be received by the methanation and gas cooling unit from the RSC, where the water was used to cool raw syngas in the RSC. The temperature and pressure of the water used to cool the raw syngas in the RSC may be set based upon the heat transfer area (such as the surface area across which the water may interact with the syngas). This heat transfer area may, for example, be related to the length, circumference, or other measure of size of the RSC, and thus, the length and/or amount of cooling tubing within the RSC that acts as a heat exchanger with the syngas in the RSC. Furthermore, the heat transfer area of the RSC may be set based on the expected amount of heat to be transferred to the water as it passes through a methanation unit of the methanation and gas cooling unit. In this manner, existing equipment such as the RSC may be utilized to preheat water to be superheated for use in a steam turbine without the need for additional heat exchange equipment.

Additionally, the RSC may transmit syngas and water to a water-gas shift reactor for adjustment of a ratio of hydrogen to carbon monoxide in the syngas. The syngas and water ratio may change during the life of the RSC. Accordingly, additional water may be transmitted to the water-gas reactor to maintain a relatively constant water (e.g., steam) to dry gas ratio of syngas and water transmitted from the RSC to the water-gas reactor. A controller may be provided to maintain the water (e.g., steam) to dry gas ratio whereby the controller may adjust the amount of additional water transmitted to the water-gas reactor by adjusting the opening and closing of a valve. The controller may adjust the valve based on measurements made by a sensor regarding the amount of fouling occurring in the RSC, specifically, in the amount of fouling occurring around cooling tubing in the RSC.

FIG. 1 illustrates, for context, a substitute natural gas (SNG) production system 100. Elements of the SNG production system 100 may include a fuel source 102, such as a solid feed, that may be utilized as a source of energy for the production of SNG. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock gasification and scrubbing system 104. The feedstock gasification and scrubbing system 104 may include several subsystems. For example, the feedstock gasification and scrubbing system 104 may include a feedstock preparation subsystem that may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation subsystem to create slurry feedstock. In other embodiments, no liquid is added to the fuel source in the feedstock preparation subsystem, thus yielding dry feedstock.

The feedstock may be passed to a gasification subsystem of the feedstock gasification and scrubbing system 104 from the feedstock preparation subsystem. The gasification subsystem may convert the feedstock into a combination of carbon monoxide and hydrogen, e.g., syngas. This conversion may be accomplished by subjecting the feedstock to a controlled amount of steam and oxygen at elevated pressures, e.g., from between approximately 20 bar and approximately 85 bar, and temperatures, e.g., between approximately 1300° Fahrenheit and approximately 2900° Fahrenheit, depending on the type of gasifier utilized in the gasification subsystem. The gasification process may also include the feedstock undergoing a pyrolysis process, whereby the feedstock is heated. Temperatures inside the gasifier of the gasification subsystem may range from between approximately 300° Fahrenheit and approximately 1300° Fahrenheit during the pyrolysis process, depending on the fuel source 102 utilized to generate the feedstock. The heating of the feedstock during the pyrolysis process may generate a solid, e.g., char, and residue gases, e.g., carbon monoxide, hydrogen, and nitrogen. The char remaining from the feedstock from the pyrolysis process may only weigh up to approximately 30% of the weight of the original feedstock.

A combustion process may then occur in the gasification subsystem. To aid with this combustion process, oxygen 103 may be supplied to the gasification subsystem from an air separation unit (ASU) 106. The ASU 106 may operate to separate air 105 into component gases by, for example, distillation techniques that may be cryogenic or may utilize pressure swing adsorption (PSA). The ASU 106 may separate oxygen 103 from the air supplied to it and may transfer the separated oxygen 103 to the gasification subsystem. Additionally the ASU 106 may separate nitrogen 107 from the air 105, for example, for collection or for further use in power generation.

Accordingly, oxygen 103 separated from air 105 is received by the gasification subsystem from the ASU 106 for combustion purposes. The combustion may include introducing oxygen 103 to the char and residue gases so that the char and residue gases may react with the oxygen 103 to form carbon dioxide and carbon monoxide, thus providing heat for the subsequent gasification reactions. The temperatures during the combustion process may range from between approximately 1300° Fahrenheit and approximately 2900° Fahrenheit. Next, steam may be introduced into the gasification subsystem of the feedstock gasification and scrubbing system 104 during a gasification step. The char may react with the carbon dioxide and steam to produce carbon monoxide and hydrogen at temperatures ranging from between approximately 1500° Fahrenheit and approximately 2900° Fahrenheit. In essence, a gasifier of the gasification subsystem utilizes steam and oxygen to allow some of the feedstock to be combusted to produce carbon dioxide and energy, thus driving a main reaction that converts further feedstock to hydrogen and additional carbon monoxide.

In this way, a resultant gas is manufactured by the gasifier of the gasification subsystem. This resultant gas may include approximately 85% of carbon monoxide and hydrogen, as well as $CH_4$, $NH_3$, COS, $CO_2$, and $H_2S$ (based on the sulfur content of the feedstock). This resultant gas may be termed raw or untreated syngas. The gasification subsystem may also generate waste, such as slag 108, which may be a wet ash material.

This slag 108 may be removed from the gasification subsystem by a scrubbing subsystem of the feedstock gasification and scrubbing system 104. The slag 108 may be disposed of, for example, as road base, or as another building material. Additionally, the scrubbing subsystem may treat the raw syngas by removing any particulate matter from the raw syngas, such as the wet ash.

The raw syngas may then be passed to a water-gas shift reactor 110 along path 111. The water-gas shift reactor 110 may perform a water-gas shift reaction in which carbon monoxide reacts with water, (e.g. steam), to form carbon dioxide and hydrogen. This process may adjust the ratio of hydrogen to carbon monoxide in the raw syngas from approximately 1 to 1 to shifted syngas that includes a ratio of hydrogen to carbon monoxide of approximately 3 to 1 for the methanation process. It should be noted that the water-gas shift reactor 110 may be a sour water-gas shift reactor, that is, sulfur may be present in the raw syngas fed into the water-gas shift reactor 110 during the water-gas shift reaction.

Subsequent to the water-gas shift reaction in the water-gas shift reactor 110, the system 100 may transmit the raw shifted syngas along path 112 to a gas treating unit 114. The gas treating unit 114 may scrub the raw shifted syngas, (e.g., syngas product of the water-gas shift reactor 110 and containing sulfur), to remove unwanted elements, for example, the, COS, and $H_2S$ from the raw shifted syngas, to generate treated syngas, (e.g., syngas without sulfur). Additionally, the gas treating unit 114 may transmit the unwanted elements of the raw shifted syngas, (e.g., the, and $H_2S$) to the sulfur recovery and tail gas treating unit 116 for the separation and isolation of the sulfur 118. In this manner, the sulfur 118 may be removed for disposal or for sale.

To further aid in acid gas (e.g., $H_2S$) removal in the gas treating unit 114, a portion (for example, approximately 10%, 20%, 30%, 40%, 50% or more) of the raw shifted syngas may be transmitted to an ammonia chiller 113. The ammonia chiller 113 may operate as, for example, a heat exchanger. In one embodiment, the ammonia chiller 113 may, for example, include an evaporator, a generator, an absorber, and a condenser. The evaporator may be kept at low pressure, for example, as a vacuum. The low-pressure of the evaporator may cause a refrigerant, such as $NH_3$ (ammonia), to boil at a very low temperature. The evaporator may include a heat exchanger to exchange heat with the raw shifted syngas, adding heat to the refrigerant in the evaporator. The evaporator may also take heat from the surroundings of the evaporator. Because of this heat transfer, the refrigerant may be converted into vapor which may flow into the absorber. The absorber may combine the refrigerant vapor with water. For example, the absorber cools and condenses the refrigerant vapor into water via a heat exchanger that circulates a coolant (e.g., water). The water, rich with refrigerant, may then be pumped via an absorbent pump to the generator.

In the generator, heat may be transferred to the refrigerant rich water by an external heat source, such as hot water or steam. The heat from the hot water or steam may boil the refrigerant off from the rich water to generate a refrigerant vapor. The refrigerant vapor from the generator may be transmitted to the condenser, where the refrigerant vapor may be converted into liquid by exchanging heat with a coolant, such as water. The cooled refrigerant may then returned to the low-pressure evaporator, where it may be used to remove heat to generate cooled raw shifted syngas, thus completing a thermodynamic cycle. The cooled raw shifted syngas may be reintroduced to the raw shifted syngas along path 115, which may introduce the cooled raw shifted syngas to the raw shifted syngas flowing along path 112. Additionally or alternatively, the cooled raw shifted syngas may be directly introduced into the gas treating unit 114 along path 117.

The treated syngas generated by the gas treating unit 114 may include approximately 3% CO, approximately 55% $H_2$, and approximately 40% $CO_2$ and is substantially stripped of $H_2S$. The gas treating unit 114 may further include a $CO_2$ removal subsystem that may strip $CO_2$ 119 from the treated syngas. The stripped $CO_2$ 119 may be transmitted from the gas treating unit 114 to the $CO_2$ dehydration and compression unit 120 that may dehydrate and compress the $CO_2$ 119 for storage and subsequent use. For instance, the $CO_2$ 119 may be sent through a pipeline leading to a carbon sequestration site, such as enhanced-oil recovery (EOR) sites or saline aquifers. Alternatively, the $CO_2$ dehydration and compression unit 120 may transmit the dehydrated and compressed $CO_2$ 119 to, for example, a chemical plant for use therein.

The gas treating unit 114 may directly or indirectly transmit the treated syngas along path 121 to a methanation and gas cooling unit 122. In one embodiment, path 121 may pass through a heat exchanger in the water-gas shift reactor 110 in an effort to heat the treated syngas prior to transmission to the methanation and gas cooling unit 122. The methanation and gas cooling unit 122 may convert the CO and the $H_2$ in the treated syngas into $CH_4$ and $H_2O$, that is, into methane, (e.g., SNG 123), and water as an exothermic reaction. Accordingly, the methanation and gas cooling unit 122 may include a methanation reactor 125 that may operate to generate the SNG 123 and water as well as to operate as a heat exchanger that utilizes a coolant (e.g., water) to cool the resultant SNG 123. This heat exchange may generate steam, which the methanation and gas cooling unit 122 transmits to a steam turbine 124 for generation of power 126. The power 126 may be used by, for example, various manufacturing plants or may be transmitted to a power grid for subsequent use. It should be noted that the methanation and gas cooling unit 122 may include a sweet methanation reactor that utilizes treated syngas, (e.g., sulfur has been removed from the syngas), prior to the syngas being converted into SNG 123 and water.

The methanation and gas cooling unit 122 may transmit the generated SNG 123 and water to a SNG dehydration and compression unit 128. This SNG dehydration and compression unit 128 may separate the water from the SNG 123, so that the SNG 123 may be compressed and transmitted from the SNG dehydration and compression unit 128 to, for example, an SNG pipeline. The SNG pipeline may be used to transmit the SNG 123 to, for example, storage facilities or additional SNG treatment facilities. In one embodiment, elements of the feedstock gasification and scrubbing system 104 may be matched to the workings of the methanation and gas cooling unit 122, as will be described in greater detail below.

Figure 2:
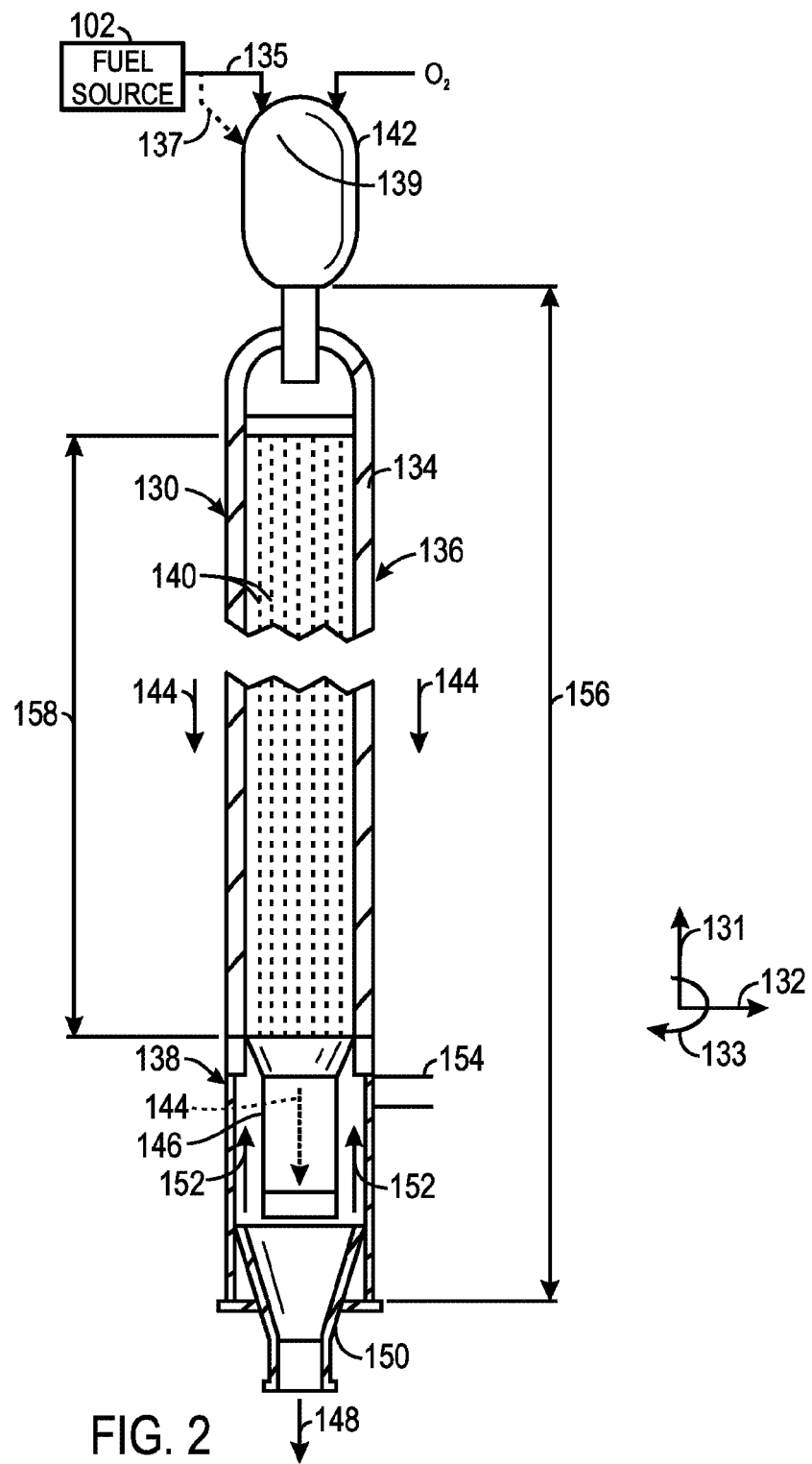
FIG. 2 is a cross-sectional side view of an embodiment of a radiant syngas cooler of FIG. 1.

The feedstock gasification and scrubbing system 104 may include a radiant syngas cooler as a part of the scrubbing subsystem. FIG. 2 is a cross-sectional side view of an embodiment of a radiant syngas cooler (RSC) 130 for use with the feedstock gasification and scrubbing system 104 of FIG. 1. Various aspects of the RSC 130 may be described with reference to an axial direction or axis 131, a radial direction or axis 132, and a circumferential direction or axis 133. For example, the axis 131 corresponds to a longitudinal centerline or lengthwise direction, the axis 132 corresponds to a crosswise or radial direction relative to the longitudinal centerline, and the axis 133 corresponds to the circumferential direction about the longitudinal centerline. Syngas, as well as waste such as slag 108, may be generated in a gasifier (i.e., gasification subsystem) of the feedstock gasification and scrubbing system 104. This slag 108 may be removed prior to transmission of the raw syngas to the water-gas shift reactor 110. The RSC 130 may be useful for separating the slag 108 from the syngas. Moreover, it may be beneficial to cool the syngas prior to transmission to the water-gas shift reactor 110 via the RSC 130.

The RSC 130 may also include a vessel 134. The vessel 134 may act as an enclosure for the RSC 130, enclosing both an upper region 136 of the RSC 130 as well a lower region 138 of the RSC 130. The vessel 134 may also house cooling tubing 140, which may be in the upper region 136 of the RSC 130. The cooling tubing 140 may include a plurality of conduits along the radial axis 132 of the RSC 130, and may also run parallel in direction with the vessel 134 relative to the axial axis 131. A coolant, such as water or another liquid, may flow through the tubing 140. Thus, the tubing 140 may act as a heat exchanger within the RSC 130, and may circulate the coolant for removal of heat from the syngas and slag 108. The syngas generated in the gasifier 142 may generally flow in a downward manner parallel to the tubing 140 as indicated by arrows 144. The gasifier 142 may, for example include an input from fuel source 102 along path 135 as well as an input for oxygen from, for example, the ASU 106. In one embodiment, fuel from the fuel source along path 135 may be mixed with the oxygen and combusted in, for example, a flame zone 139 in the gasifier 142 to generate syngas. Furthermore, in some embodiments, a portion of the fuel may be added along a secondary path 137 into the flame zone 139 of the gasifier 142. In one embodiment, between approximately 5% and approximately 20% of the fuel directed into the gasifier 142 may be diverted along path 137 to adjust the amount of methane in the syngas generated by the gasifier 142.

The generated syngas (as well as any fuel added along path 137) may engage the tubing 140 of the RSC 130 with the coolant flowing through the tubing 140, thereby cooling the syngas as it travels through the RSC 130. One result of this cooling process may be the generation of steam in the tubing 140, which may then be transmitted from the RSC 130 as will be discussed further with respect to FIG. 1.

The RSC 130 may also include a conduit 146 in the lower region 138 of the RSC 130 that may aid in directing the cooled syngas and slag 108 out of the RSC 130. For example, as the slag 108 exits the conduit 146, the slag 108 may flow in a generally downward direction 148 to exit the RSC 130 via a quench cone 150 containing water to cool the slag 108. In contrast, the cooled syngas may flow in a general upward direction 152 towards a transfer line 154 as the syngas exits the conduit 146. The cooled syngas may, in some embodiments, interact with the water in the quench cone 150 such that steam may be transferred to the cooled syngas in a ratio of approximately between 1.0:1 and 1.4:1. The transfer line 154 may be used to transmit the syngas to the water-gas shift reactor 110 via path 111. Further description with respect to the cooling of the syngas in the RSC 130 will be described below.

Hot syngas and slag may flow from the gasifier 106 through the upper region 136 of the RSC 130. As the hot syngas and slag 108 move downward through the RSC 130, the slag 108 may drop in a fairly uniform manner, e.g., axially 131 downwards 144 through the RSC 130. In contrast, the syngas, as it is in a gaseous state, may begin to flow axially 131 through the RSC 130, however, the syngas may disperse radially 132 throughout the vessel 134 as well as flow axially 131 downwards 144 through the RSC 130. In this manner, the syngas, as it flows through the RSC 130, may interact with the cooling tubing 140 that may include a plurality of conduits that may run axially 131 parallel with the vessel 134. Additionally, a coolant, such as water, may flow through the cooling tubing 140. This water may, for example, be supplied by the steam turbine 124 as will be discussed in greater detail with respect to FIG. 1. This coolant (e.g., water) thus flow from the cooling tubing 140 out of the RSC 130 and may be transmitted as high pressure steam, as will be described in greater detail with respect to FIG. 1.

The coolant passing through cooling tubing 140 may be, for example, boiler feed water from the steam turbine 124. The water may be, for example, approximately 630° Fahrenheit. In another embodiment, the water temperature may range from between approximately 450° Fahrenheit and approximately 670° Fahrenheit, between approximately 400° Fahrenheit and approximately 750° Fahrenheit, between approximately 500° Fahrenheit and approximately 650° Fahrenheit, or higher, as process industry needs dictate. In contrast, the syngas passing through the RSC 130 may be cooled from between approximately 2500° Fahrenheit and approximately 1200° Fahrenheit as the syngas interacts with the cooling tubing 140. That is, as the heated syngas interacts with the cooling tubing 140, it may transfer heat to both the fluid inside the cooling tubing 140, as well as the cooling tubing 140 themselves, thus cooling the syngas while generating a source of steam that may be utilized by, for example, the steam turbine engine 124.

In one embodiment, the length 156 of the tubing 140 in the RSC 130, and thus, the tubing 140 therein may be determined based on the requirements of the SNG production system 100. The length 156 of the RSC 130 may be, for example, between approximately 70 feet and approximately 100 feet. In another example, the length 156 of the RSC 130 may be approximately 70 feet, 80 feet, 90 feet, or 100 feet. The length 156 of the RSC 130 may affect the length 158 of the tubing 140, and thus, the amount of heat transferred between the syngas and the water passing through the tubing 140. The amount of heat transferred to the water in the tubing 140 may change the exit temperature and pressure of the water exiting the RSC 130. For example, the length 156 of the RSC 130 may be selected such that the water exiting the RSC 130 may be at a temperature of between approximately 550° Fahrenheit and approximately 700° Fahrenheit at a pressure of between approximately 1000 psi and approximately 1200 psi. Both the exiting pressure and the exiting temperature of the water exiting the RSC 130 from the tubing 140 may be set such that the water exiting the RSC 130 may be at a desired pressure and temperature to allow for, for example, superheating in the methanation reactor 125 of the methanation and gas cooling unit 122. That is, a generated pressure and temperature of the water exiting the RSC 130 from the tubing 140 may be based on an amount of heat to be transferred to the water in the fluid flow path as it passes through a methanation reactor 125 in a methanation unit of the methanation and gas cooling unit 122. It should be noted that while the above example discussed adjustment of the length 156 of the RSC 130 and/or the tubing 140, in other embodiments, adjustment of other factors regarding the size of the RSC, such as the circumference, may be adjusted in an effort to set the overall heat transfer area of the RSC 130.

Moreover, the water that may be used as a cooling fluid in the tubing 140 may be preheated. Returning to FIG. 1, the steam turbine 124 may include boiler feedwater used, for example, in the generation of steam. This boiler feedwater may also be used as a source for the cooling fluid used in the tubing 140 of the RSC 130. For example, the steam turbine 124 may transmit boiler feedwater along path 160 to the methanation and gas cooling unit 122. The feedwater along path 160 transmitted to the methanation and gas cooling unit 122 may be at a temperature of approximately 250° Fahrenheit or between approximately 225° Fahrenheit and approximately 270° Fahrenheit. Once received at the methanation and gas cooling unit 122, the feedwater may pass through a heat exchanger in the methanation and gas cooling unit 122 (e.g., such as the methanation reactor 125 or a separate heat exchanger), whereby heat is transmitted to the water. Accordingly, the water leaving the methanation and gas cooling unit 122 along path 162 may be at a temperature of approximately 300° Fahrenheit or between approximately 275° Fahrenheit and approximately 325° Fahrenheit.

The water in path 162 may be transmitted to another heat exchanger 163, for example, located in the water-gas shift reactor 110, to absorb more heat. For example, the water along path 162 may be approximately 300° Fahrenheit or between approximately 275° Fahrenheit and approximately 325° Fahrenheit. Once the water enters the heat exchanger 163 in the water-gas shift reactor 110, the temperature of the water may rise to, for example, approximately 500° Fahrenheit or between approximately 450° Fahrenheit and approximately 550° Fahrenheit. The water at approximately 500° Fahrenheit or between approximately 450° Fahrenheit and approximately 550° Fahrenheit may be transmitted along path 164 to the RSC 130 to act as a cooling liquid in the RSC 130, may pass through, for example, the cooling tubing 140, as previously described. The water may then exit the RSC 130 along path 166 at a temperature of between approximately 550° Fahrenheit and approximately 700° Fahrenheit at a pressure of between approximately 1000 psi and approximately 1200 psi. This water along path 166 may be transmitted to one or more methanation reactors 125 in the methanation and gas cooling unit 122, which may operate as heat exchangers. That is, the water along path 166 transmitted to the one or more methanation reactors 125 may undergo superheating in the one or more methanation reactors 125 and may exit the methanation and gas cooling unit 122 as high pressure steam at a pressure of between approximately 1200 psi and approximately 1500 psi at a temperature of between approximately 750° Fahrenheit and approximately 950° Fahrenheit, which may be transmitted along path 168 to the steam turbine 124 to be used to generate power 126. The output temperature of the water along path 168 may be determined based on the length 156 of the RSC 130 (i.e., which determines the pressure and temperature of the water along path 166 to be superheated in the one or more methanation reactors 125). In one embodiment, low pressure water between approximately 50 and approximately 100 psi and at a temperature of between approximately 500° Fahrenheit and approximately 600° Fahrenheit may also be transmitted to the one or more methanation reactors 125 in the methanation and gas cooling unit 122 along path 170. This low pressure water along path 170 may also be superheated in the one or more methanation reactors 125 to generate low pressure steam at a temperature of between approximately 750° Fahrenheit and approximately 950° Fahrenheit, which may be transmitted along path 172 to the steam turbine 124 to be used to generate power 126.

Referring again to FIG. 2, as the syngas passes through the vessel 134 of the RSC 130, the syngas may be carrying residue from the gasification process, such as ash. This residue may be deposited on the cooling tubing 140 over time. These deposits on the cooling tubing 140 may "foul" the cooling tubing 140 over time. That is, the materials deposited on the cooling tubing 140 may cause a film to develop on the outer surfaces of the cooling tubing 140. These deposits may cause a steam to dry gas ratio of the RSC 130 to increase. That is, the fouling may alter the cooling of the syngas such that as the syngas contacts water in the quench cone 150, a greater amount of steam may be generated raising the steam to dry gas ratio from between approximately 0.8:1 and approximately 0.9:1 to between approximately 1.0:1 and approximately 1.4:1 as the RSC 130 moves from a start of run time to an end of run time. To smooth this steam to dry gas ratio so that it is consistently between approximately 1.9:1 and approximately 1.4:1 for the entire life of the RSC 130, water exiting the tubing 140 of the RSC 130 along path 166 may be diverted to be added to the raw syngas transmitted along path 111 in the water-gas shift reactor 110. As illustrated in FIG. 1, path 174 may diverge from path 166 such that water may be transmitted to the water-gas shift reactor 110, via for example, path 111, to increase the steam to dry gas ratio in the water-gas shift reactor 110 when necessary. The amount of water transmitted along path 174 may be adjusted via, for example, a valve 176. This valve 176 may be opened and closed to vary the amount of water that is transmitted to the water-gas shift reactor 110. A controller 178 may operate to adjust the opening and closing of the valve 176. This controller 178 may include one or more "general-purpose" microprocessors, one or more special-purpose microprocessors and/or application specific integrated circuits (ASICS), or some combination of such processing components, a central processing unit (CPU), and/or other types of processors. In one embodiment, the controller 178 may adjust the opening and closing of the valve 176 based on measurements received from a sensor 180, which may be connected to the RSC 130. This sensor 180 may, for example, measure the amount of fouling that has occurred in the RSC 130 by measuring the temperature of the fluid passing through, for example, the tubing 140 in the RSC 130 and to generate signals corresponding to the measured temperature to be utilized to determine an amount of fouling of the tubing 140 in the RSC 130. For example, as the measured temperature by the sensor increases, the overall steam production (affecting the steam to dry gas ratio previously discussed) may decrease. Thus, the valve 176 may be opened by the controller 178 to allow for more steam to be added to the water syngas mixture passed to the water-gas shift reactor 110. Additionally or alternatively, the sensor 180 may, for example, measure the steam to dry gas ratio in the RSC 130 and generate signals based on the measurements that may be used by the controller 178 to control the opening and closing of valve 176 in a manner similar to that discussed above.

Figure 3:
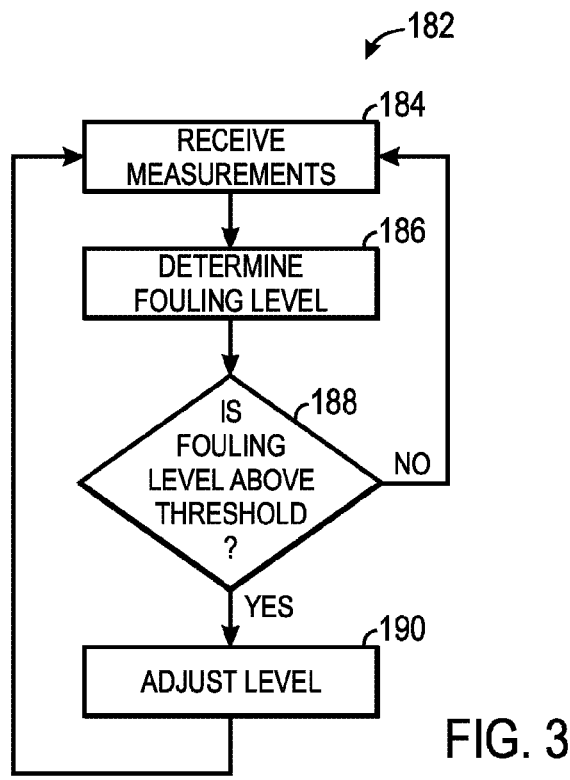
FIG. 3 is a flow chart illustrating control of an amount of liquid transmitted to the water-gas shift reactor of FIG. 1.

FIG. 3 is a flow chart 182 illustrating a method for controlling the amount of water transmitted along path 174 to the water-gas shift reactor 110. In step 184, the controller 178 may receive measurements regarding the fouling of the tubing 140 in the RSC 130. These measurements may be received from the sensor 180 and may be related to, for example, the temperature of fluid passing through tubing 140 in the RSC 130 or a steam to dry gas ratio of fluid exiting the RSC 130 via transfer line 154. Based on the received measurements, in step 186, the controller 178 may determine the fouling level in the RSC 130. Typically, the fouling of the tubing 140 in the RSC 130 will be minimal at the start of run of the RSC 130 and will increase over time.

In step 188, the controller may determine if the fouling level determined in step 186 is above a threshold, for example, based on signals received from the sensor 180 that correspond to the measurements of the sensor 180. This threshold may include one or more levels that may correspond to the how open or closed the valve 176 should be, thus regulating the amount of water to be transmitted along path 174. If the controller 178 determines that the fouling level is not above the threshold (i.e., a particular level) the controller 178 may not adjust the valve 176 and the process may return to step 184. If, however, the controller 178 determines that the fouling level is above the threshold (i.e., a particular level) the controller 178 may adjust the valve 176 accordingly in step 190. That is, the controller 178 may open or close the valve 176 by a predetermined amount, which may correspond to the threshold tested in step 188. Subsequent to step 190, the process may revert back to step 184 to restart the above described method. The steps in the flow chart 182 may be repeated on a pre-determined schedule. For example, the steps in the flow chart 182 may be repeated hourly, daily, weekly, monthly, or at some other frequency. Additionally and/or alternatively, the steps in the flow chart 182 may be repeated at a specified time chosen by a user. That is, a user may initiate the above described method at any time and with any frequency.

Figure 4:
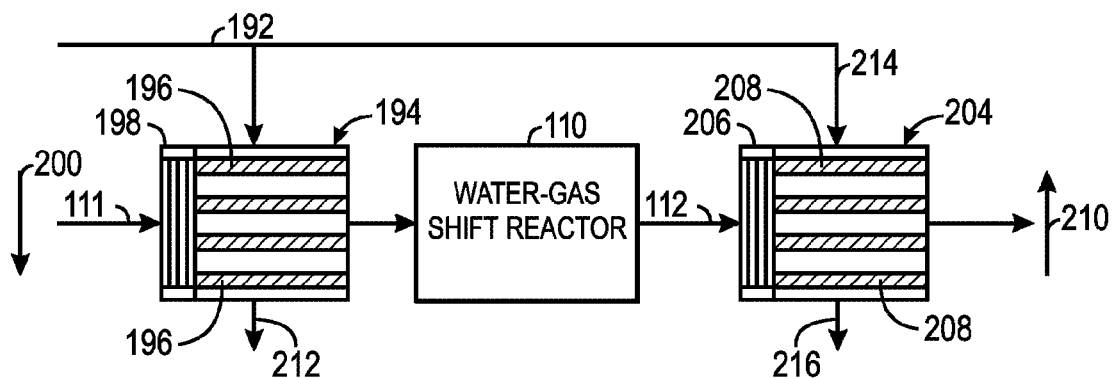
FIG. 4 is a schematic block diagram of an embodiment of a fluid superheating system for a SNG production system of FIG. 1.

FIG. 4 illustrates another manner of superheating the water exiting the RSC 130, through re-routing of the water along path 166. As noted above, a portion of the water exiting the RSC 130 may have been diverted to path 111 via valve 176 and controller 178. The remaining water in path 166 may be routed to path 192, and may be at a temperature of between approximately 550° Fahrenheit and approximately 700° Fahrenheit. Some of this water, for example, between approximately 5% and approximately 15%, may be transmitted to a heat exchanger 194 while the remainder may be transmitted to heat exchanger 204. Heat exchanger 194 may include tubing 196 through which the raw syngas may pass from path 111. Heating of the syngas may aid in the overall efficiency of the water-gas shift reactor 130 because catalysts utilized in accelerating the water-gas shift reaction in the water-gas shift reactor 110 may react with heated syngas more quickly than with cold syngas. Accordingly, the syngas may be raised from a temperature of between approximately 300° Fahrenheit and approximately 400° Fahrenheit as the syngas exits the RSC 130 to a temperature of between approximately 400° Fahrenheit and approximately 500° Fahrenheit as the syngas exits the heat exchanger 194.

In the heat exchanger 194, the syngas may be transmitted into a distribution plate 198. The distribution plate 198 may, for example, operate to disperse the syngas evenly throughout the heat exchanger 194. Accordingly, the evenly dispersed syngas flows from the distribution plate 198 into an interior of, and through, the tubing 196 of the heat exchanger 194. Water from path 192 that has exited the RSC 130 may be passed through the heat exchanger 194, generally in the direction indicated by arrow 200, to add heat to the syngas by warming the tubes 196 (e.g., by contacting the exterior of the tubes 196) through which the syngas passes. The water may exit the heat exchanger 194 along path 212 for transmission to path 160.

Heat exchanger 204 works in a similar manner to heat exchanger 194, however, the heat exchanger 204 may remove heat from the syngas instead of imparting heat to the syngas. For example, water may be received from path 192, after the split with heat exchanger 204, along path 214. This water may be transmitted into the heat exchanger 204 and may remove heat from the syngas therein.

For example, syngas may exit the water-gas shift reactor 110 along path 112 at a temperature of between approximately 850° Fahrenheit and approximately 950° Fahrenheit. This syngas may be transmitted into a distribution plate 206. The distribution plate 206 may, for example, operate to disperse the syngas evenly throughout the heat exchanger 204. Accordingly, the evenly dispersed syngas flows from the distribution plate 206 into an interior of, and through, the tubing 208 of the heat exchanger 204. Water from path 202 that has exited the heat exchanger 194 may be passed through the heat exchanger 204, generally in the direction indicated by arrow 210, to remove heat from the syngas by cooling the tubes 208 (e.g., by contacting the exterior of the tubes 208) through which the syngas passes. The water may exit the heat exchanger 194 along path 216 for transmission to the steam turbine 124 at a temperature of between approximately 750° Fahrenheit and approximately 850° Fahrenheit or for transmission back to path 166 to the methanation and gas cooling unit 122.

Thus, through the use of existing equipment such as the RSC 130, water may be preheated to a level such that introduction of heat from a methanation and gas cooling unit 122 to the preheated water may generate superheated steam for use in a steam turbine 124. Moreover, when the RSC 130 is utilized to preheat the water, the need for additional heat exchange equipment may be reduced. Additionally, the preheated water may be utilized to, or through the use of heat exchangers 194 and 204

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a substitute natural gas (SNG) production system, comprising:
a gasifier configured to generate syngas;
a radiant syngas cooler (RSC) configured to cool the syngas through transfer of heat between the syngas and a fluid in a flow path, wherein the RSC has a length of between approximately 70 feet and approximately 100 feet; and
a methanation unit configured to generate SNG from the syngas
wherein the fluid flow path exits from the RSC and passes through the methanation unit, wherein generated pressure and a temperature of the fluid in the fluid flow path is based on an amount of heat to be transferred from the methanation unit to the fluid in the fluid flow path as the fluid passes through the methanation unit, wherein the fluid comprises water transmitted from a steam turbine along a second fluid flow path between the steam turbine and the RSC, wherein the methanation unit comprises a heat exchanger, wherein the methanation unit is disposed in the second fluid flow path between the steam turbine and the RSC.

2. The system of claim 1, wherein the methanation unit comprises a methanation reactor configured to generate SNG from the syngas.

3. The system of claim 2, wherein the methanation reactor comprises a heat exchanger configured to superheat the fluid in the fluid flow path to between approximately 750° Fahrenheit and approximately 950° Fahrenheit.

4. The system of claim 1, wherein the gasifier is configured to receive fuel along two distinct paths into a flame zone of the gasifier to modify an amount of methane in the syngas produced from the gasifier.

5. The system of claim 1, comprising a water-gas shift reactor comprising a second heat exchanger, wherein the water-gas shift reactor is disposed in the second fluid flow path between the methanation unit and the RSC.

6. A system, comprising:
a radiant syngas cooler (RSC) comprising cooling tubing configured to transmit a fluid, wherein the RSC is configured to have a heat transfer area such that the RSC generates a pressure and a temperature of the fluid exiting the RSC to a level allowing for superheating of the fluid to between approximately 750° Fahrenheit and approximately 850° Fahrenheit, and wherein the heat transfer area is determined based on an amount of heat to be transferred to the fluid as the fluid passes through a heat exchanger in a first path external to the RSC.

7. The system of claim 6, wherein the heat exchanger comprises a distribution plate for receiving syngas at a temperature of between approximately 850° Fahrenheit and approximately 950° Fahrenheit, tubing coupled to the distribution plate, wherein the tubing is configured to carry the syngas, and contact the fluid such that the fluid is superheated to between approximately 750° Fahrenheit and approximately 850° Fahrenheit.

8. The system of claim 6, wherein the heat transfer area of the RSC is based on a length of the RSC, and wherein the length of the RSC is between approximately 70 and approximately 100 feet.

9. The system of claim 8, wherein the length of the RSC causes the pressure of the fluid to be set to between approximately 1000 psi and approximately 1200 psi.

10. The system of claim 8, wherein the length of the RSC causes the temperature of the fluid to be set to between approximately 550° Fahrenheit and approximately 700° Fahrenheit.

11. The system of claim 6, wherein the RSC is configured to transmit a second fluid with a steam to dry gas ratio of between approximately 1.0:1 and approximately 1.4:1 along a second path external to the RSC.

12. A system, comprising:
 a substitute natural gas (SNG) production system, comprising:
  a radiant syngas cooler (RSC) configured to cool syngas;
  a first fluid path from the RSC to a water-gas shift reactor, wherein the water-gas shift reactor is configured to adjust a hydrogen to carbon monoxide ratio in the syngas to generate shifted syngas;
  a methanation unit configured to generate SNG from the shifted syngas; and
  a second fluid path configured to carry a fluid from the RSC to the methanation unit, wherein a pressure and a temperature of the fluid in the second fluid path is based on an amount of heat to be transferred to the fluid in the second fluid path as the fluid passes through the methanation unit.

13. The system of claim 12, comprising a third fluid path, wherein the third fluid path carries a portion of the fluid from the second fluid path to the water-gas shift reactor.

14. The system of claim 13, comprising a valve disposed in the third fluid path, wherein the valve is configured to regulate the portion of the fluid transmitted from the second fluid path to the water-gas shift reactor.

15. The system of claim 14, wherein the RSC comprises a sensor configured to measure a temperature of fluid in tubing in the RSC and to generate signals corresponding to the measured temperature to be utilized to determine an amount of fouling of the tubing in the RSC.

16. The system of claim 15, comprising a controller coupled to the valve and the sensor, wherein the controller is configured to adjust opening and closing of the valve to regulate the portion of the fluid transmitted from the second fluid path to the water-gas shift reactor based on the signals.

17. The system of claim 16, wherein the controller is configured to adjust the opening and the closing of the valve to regulate the portion of the fluid transmitted from the second fluid path to the water-gas shift reactor based on the signals at a user initiated interval.

18. The system of claim 12, comprising a gasifier configured to generate the syngas, wherein the gasifier is configured to receive fuel along two distinct paths into a flame zone of the gasifier to modify an amount of methane in the syngas produced from the gasifier.

* * * * *